US007246821B2

(12) United States Patent
Sato

(10) Patent No.: US 7,246,821 B2
(45) Date of Patent: Jul. 24, 2007

(54) WHEELCHAIR

(75) Inventor: Hisayoshi Sato, Nagoya (JP)

(73) Assignee: MiKi Co. Ltd., Nagoya (JP)

( * ) Notice: Subject to any disclaimer, the term of this patent is extended or adjusted under 35 U.S.C. 154(b) by 135 days.

(21) Appl. No.: 10/841,061

(22) Filed: May 7, 2004

(65) Prior Publication Data

US 2005/0248143 A1 Nov. 10, 2005

(51) Int. Cl.
*B62D 21/06* (2006.01)

(52) U.S. Cl. ...................................................... 280/793

(58) Field of Classification Search ................ 280/793, 280/794, 250.1

See application file for complete search history.

(56) References Cited

U.S. PATENT DOCUMENTS 3,331,614 A * 7/1967 McClintock ................. 280/42
4,046,374 A * 9/1977 Breyley ....................... 482/68
5,020,816 A * 6/1991 Mulholland ............. 280/250.1

* cited by examiner

*Primary Examiner*—Faye M. Fleming
(74) *Attorney, Agent, or Firm*—Cooper & Dunham LLP

(57) ABSTRACT

A wheelchair has a width that can be adjusted. The wheelchair has a pair of side frames connected to each other by one or more X-frame(s) (11). The X-frame (11) has a pair of rotatable arms connected rotatably to each other at their respective centers, the lower ends of each rotatable arm being fixed to the side frame, and the fixing position of each rotatable arm to the side frame is vertically adjustable. In the wheelchair (1), when the rotatable arm(s)(11A,HA) of the X-frames(s)(11) rotate around the centers C of the rotatable arms (s)(11A,11A), the width between the side frames (3,3) can be adjusted. When the rotatable arm(s) (11A,11A) are respectively rotated, the height of the X-frame(s) (11) is changed. However, since the lower part(s) of the X-frame(s) (11) is(are) fixed to the left and right side frames (3,3), and are vertically adjustable, the left and right side frames (3,3) can be connected by the X-frames(s) (11) to correspond to the change of the height of the X-frame(s) (11).

4 Claims, 8 Drawing Sheets

1: Wheel chair 2: Chair body 3: Side frame 8: Back beam
9: Foot rest supporting beam 11, 12: X frame 11A: Rotatable arm
13: Side beam bracket 13A, 13C: Axis holes 14: Link arm bracket
14A: Screw hole 15: Main wheel 16: Beam supporting member
17: Upper side beam 19: Sheet cloth 20: Face fastener
21: Back cloth 23: Armrest pad 26: Axis: (Pivot) 46: Foot rest 47: Caster

WHEELCHAIR

FIELD OF THE INVENTION

The present invention relates to a wheelchair with an adjustable width.

BACKGROUND OF THE INVENTION

The wheelchair is used to move the disabled and can be moved without human assistance by the user by grasping the main wheels (91) or the hand rims attached to the main wheels (91) by hand to turn the main wheels as shown in FIG. 10.

PRIOR ART

Until now, wheelchairs have not been width adjustable, which makes it difficult for the user to turn the main wheels by hand in the case where the width between a main pair of wheels (91) is too wide or too narrow for the user.

DISCLOSURE OF THE INVENTION

The present invention provides a wheelchair (1) having a pair of side frames (3, 3) connected by one or more X-frame(s) (11, 12), wherein each said X-frame (11, 12) consists of a pair of rotatable arms (11A, 11A, 12A, 12A) connected rotatably to each other at their respective centers and the lower ends of each rotatable arm (11A, 11A, 12A, 12A) are fixed to said side frames (3, 3), being vertically adjustable.

It is preferable that lower part of each rotatable arm (11A, 11A, 12A, 12A) is connected to lower part of each side frame by an axis (26) being rotatably inserted into one of holes which are vertically arranged in the lower part of each side frame, and further, it is preferable that a link arm (30, 30) be positioned between the upper part of each rotatable arm and each side frame at least in a X-frame, and said link arm (30, 30) be vertically adjustable on each side frame side. In this case, it is preferable that each link arm is rotatably connected to each side frame by an axis (31, 32) being rotatably inserted into one of a plural number of holes (14A, 14B, 14C) which are vertically arranged in each side frame.

In the present invention, a pair of side frames (3,3) are connected to each other by one or more X-frame(s) (11, 12), and when a pair of rotatable arms (11A, 11A, 12A, 12A) of said X-frame(s) (11, 12) are rotated respectively around the centers of said rotatable arms (11A, 11A, 12A, 12A), the width of said X-frames (11, 12) and the width between a pair of side frames (3, 3) can be adjusted as shown in FIG. 8. At this point, the height(s) of said X-frame(s) (11, 12) may change, however, since the lower end of each rotatable arm (11A, 11A, 12A, 12A) is fixed to said side frame (3, 3) to be vertically adjustable, a pair of side frames (3,3) can be connected to correspond to the height change(s) of said X-frame(s).

The lower part of each rotatable arm (11A, 11A, 12A, 12A) is rotatably connected to the lower part of each side frame (3, 3) by an axis (26), and said axis (26) is rotatably inserted into and supported by one of a plural number of holes (13A, 13B, 13C) which are vertically arranged in the lower part of each side frame (3, 3), so that the most suitable one of said holes (13A, 13B, 13C) is selected and said axis (26) is inserted into said selected hole, and the width between a pair of side frame (3,3), in other words, the width of the wheelchair can be adjusted stepwise.

In the case where a link arm(30) is positioned between the upper part of each rotatable arm (11A, 11A, 12A, 12A) and each side frame(3,3) at least in a X-frame and said link arm (30) is fixed to said side frame (3,3) to be vertically adjustable, the position at which said link arm (30) fixes to said side frame (3,3) can be adjusted to correspond to the width between a pair of side frames (3,3), reinforcing said X-frame(s) (11,12).

Each said link arm (30) is rotatably connected to each side-frame (3) by an axis (32), and said axis is rotatably inserted into one of a plural number of holes (14A, 14B, 14C) which are vertically arranged in each side frame (3), so that the most suitable one of said holes (14A, 14B, 14C) is selected and said axis (32) is inserted into said selected hole, and fixing the position of said link in said selected hole, said link arm (30) can thus be adjusted stepwise.

BRIEF DESCRIPTION OF THE DRAWINGS

FIG. 1 is a side view of the wheel chair.

FIG. 2 is a front view of the wheel chair.

FIG. 3 is a top view of the wheel chair.

FIG. 4 is a descriptive perspective view of the sheet cloth.

FIG. 5 is a perspective view of the X-frame.

FIG. 6 is a perspective view that illustrates the connection of the X-frame to the side frame.

FIG. 7 is a perspective view that illustrates the connection of the link arm.

FIG. 8 is a descriptive front view of the width adjusting mechanism.

FIG. 9 is a descriptive front view of the folding wheel chair.

DEFINITION OF REFERENCE CHARACTERS

Figure 1:
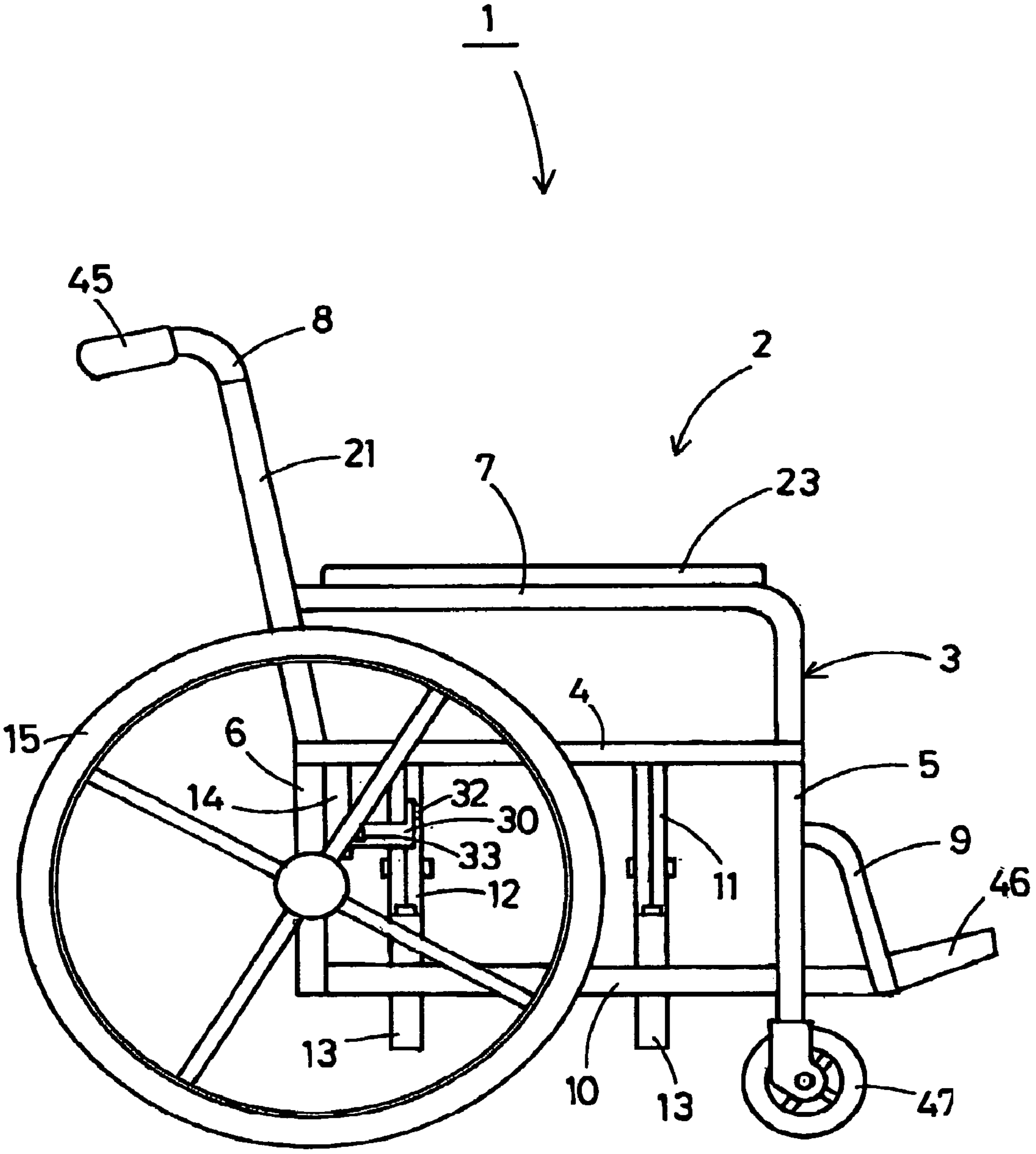
FIGS. 1 to 9 show an embodiment of the present invention.
Figure 2:
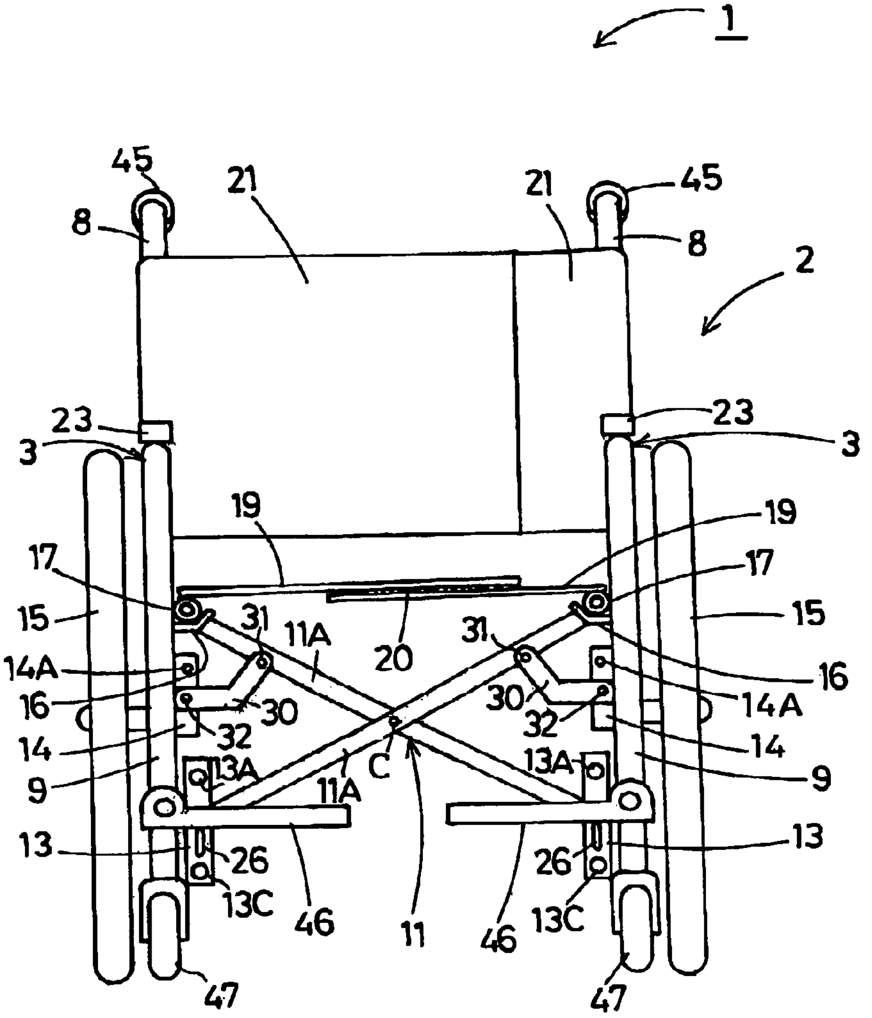

| | |
|---|---|
| 1 | Wheel chair |
| 3 | Side frame |
| 11A, 11A, 12A, 12A | Rotatable arms |
| 13A, 13B, 13C, 14A, 14B, 14C | Axis holes |
| 26, 32 | Axes |
| 30 | Link arm |

DETAILED DESCRIPTION AND PREFERRED EMBODIMENT

FIGS. 1 to 8 relates to an embodiment of the present invention. Referring to the figures, a wheelchair (1) shown in FIGS. 1 to 3 has a chair body (2) comprising a pair of left and right side frames (3,3) and each frame(3, 3) comprises left and right seat beams (4,4), front and rear leg posts (5,6), left and right arm rests (7,7), left and right back beams (8,8), left and right foot rest supporting beams (9,9) and left and right lower beams (10,10), and said left and right side frames (3,3) are connected to each other by a pair of front and rear X-frames (11,12).

A pair of left and right main wheels (15,15) are attached to said left and right rear leg posts (6,6) at the side of said chair body (2), and a pair of left and right casters (47) are attached to said left and right front leg posts (5,5). Further, a seat cloth (19) is arranged between said left and right seat beams (4,4), fixing both sides of said seat cloth to left right upper side beams (17.17) connecting upper ends of said front and rear X-frames (11,12), a back cloth (21,21) is arranged between said left and right back beams (8,8) fixing both sides of said back cloth (21,21) to said left and right back beams (8,8), and a pair of left and right foot rests(46) are respectively attached to said left and right foot rest supporting beam (9,9) to be horizontally and vertically adjustable.

Further, armrest pads (23) are respectively attached to said left and right armrests (7,7) and the upper parts of said left and right back beams (8,8) are respectively bent backwards to form left and right handles (45,45).

Figure 3:
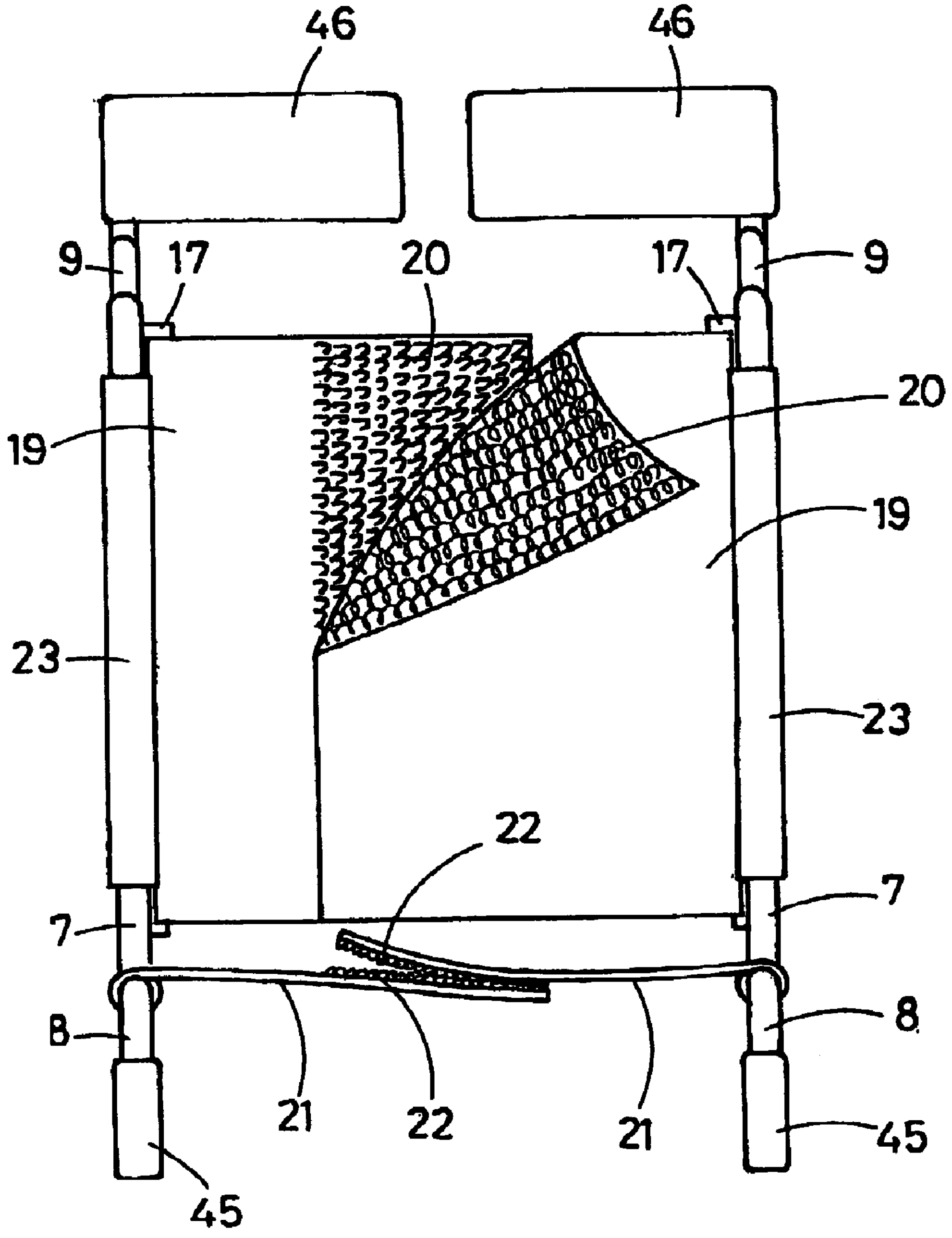
Figure 4:
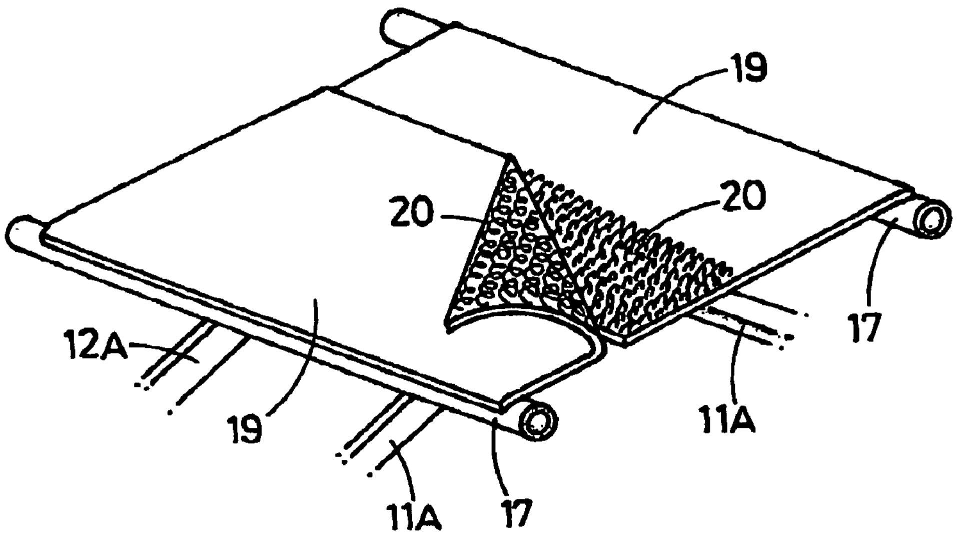

Said seat cloth (19, 19) and said back cloth (21,21) consist of separate pairs of cloths (19,19), (21,21) affixed to each other by face fasteners (20,22) as shown in FIGS. 3 and 4. Said cloth is desirably made of a strong synthetic fiber cloth such as a polyamide or polyester fiber type.

Figure 5:
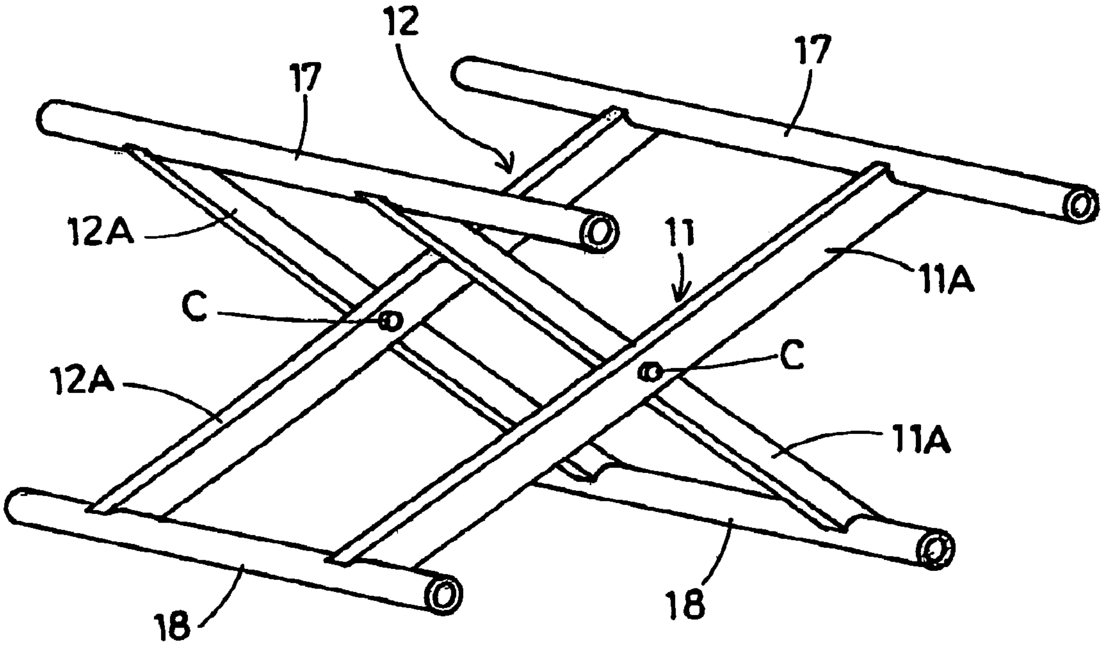

Said front and rear X-frames (11,12) connecting said left and right side frames (3,3) respectively consist of a pair of rotatable arms (11A, 11A, 12A, 12A), connected rotatably to each other at their respective centers C, and the left and right upper ends of said front and rear X-frames (11,12) are respectively connected by the left and right upper side beam pipes (17,17), and the left and right lower ends of said front and rear X-frames (11,12) are respectively connected by left and right lower side beam pipes (18,18), said upper and lower side beam pipes (17,17), (18,18) are respectively welded to the upper ends and lower ends of said front and rear X-frames (11,12) as shown in FIG. 5.

Figure 6:
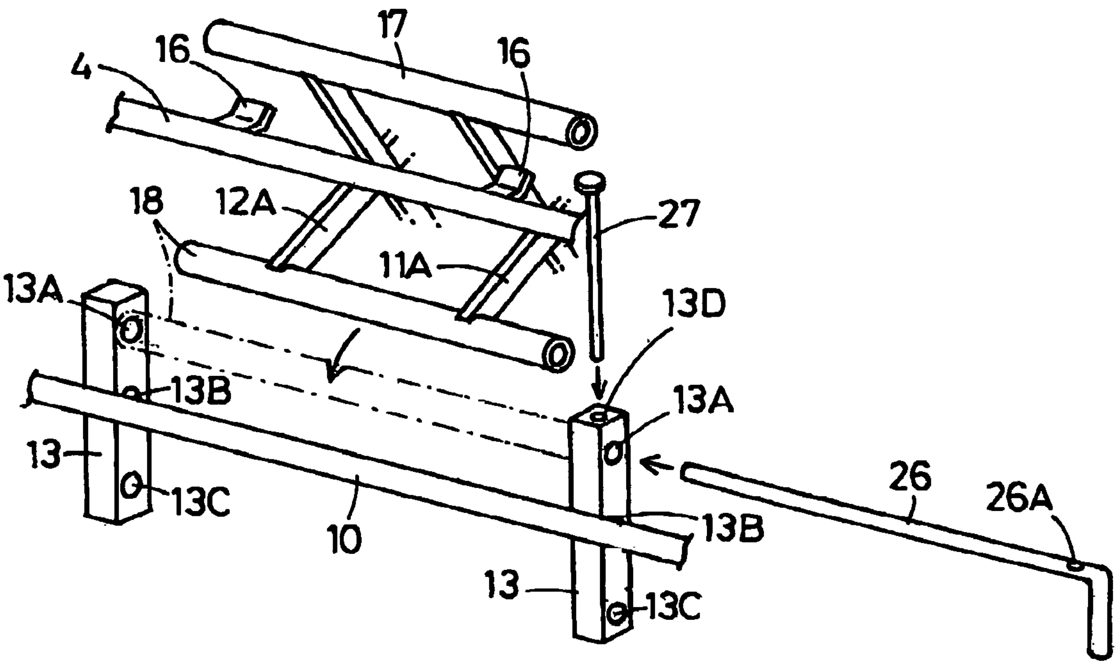

A front and rear pair of square pillar-type side beam brackets (13, 13) are welded to said left and right lower beams (10,10), and a plural number (3) of holes (13A,13B, 13C) are formed vertically in each side beam bracket (13,13) as shown in FIG. 6. The fixing holes (13D,13D) are respectively formed vertically in the front or rear side beam brackets (13,13), penetrating from upper end to lower end of said side bean brackets (13,13), and a front and rear pair of beam supporting members(16,16) project respectively from the seat beams (4,4) of each side frame (3,3).

Figure 7:
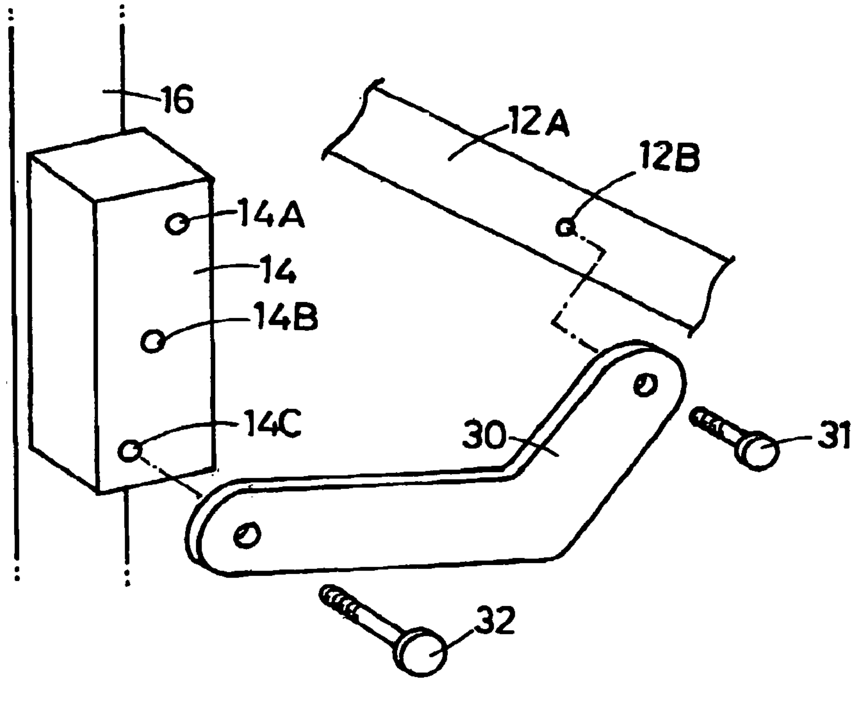
Figure 8:
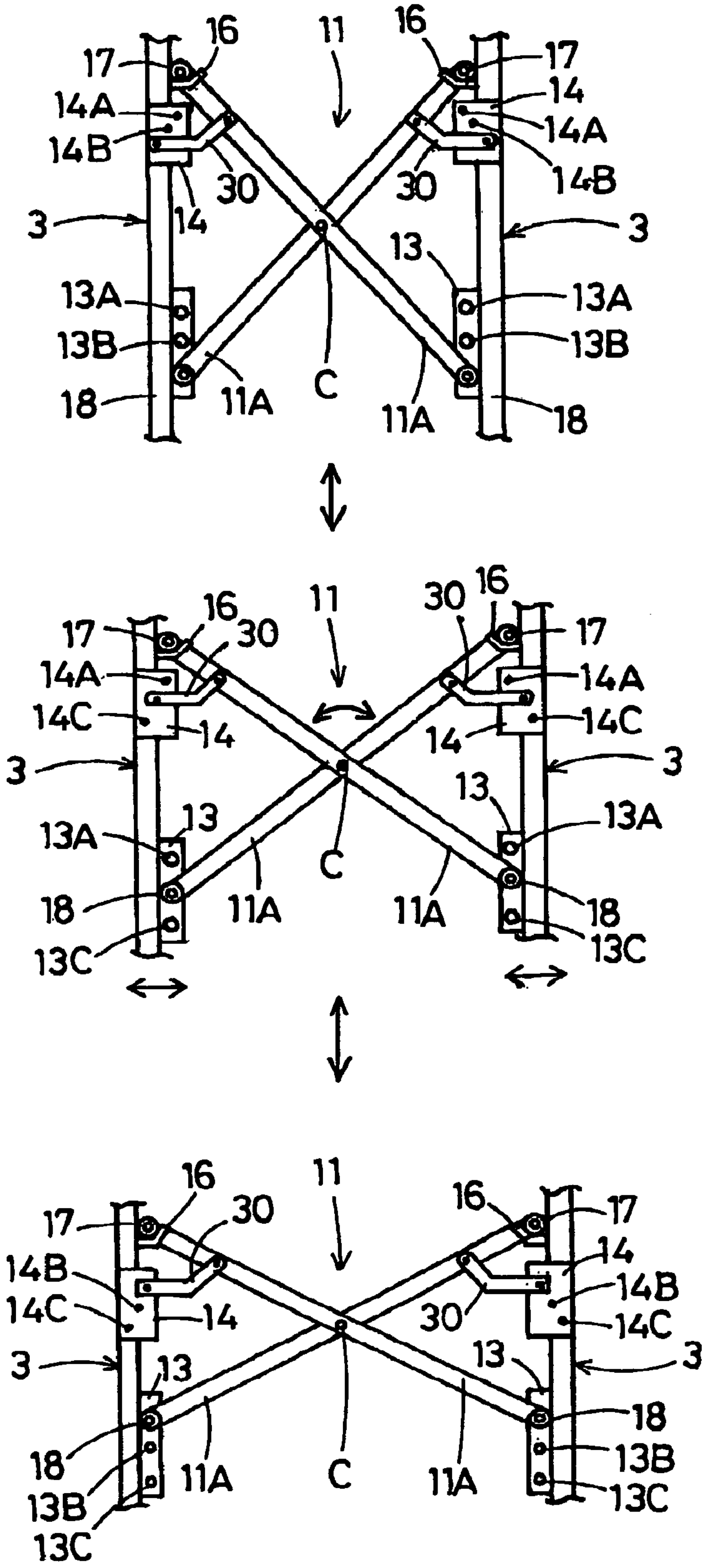
Figure 9:
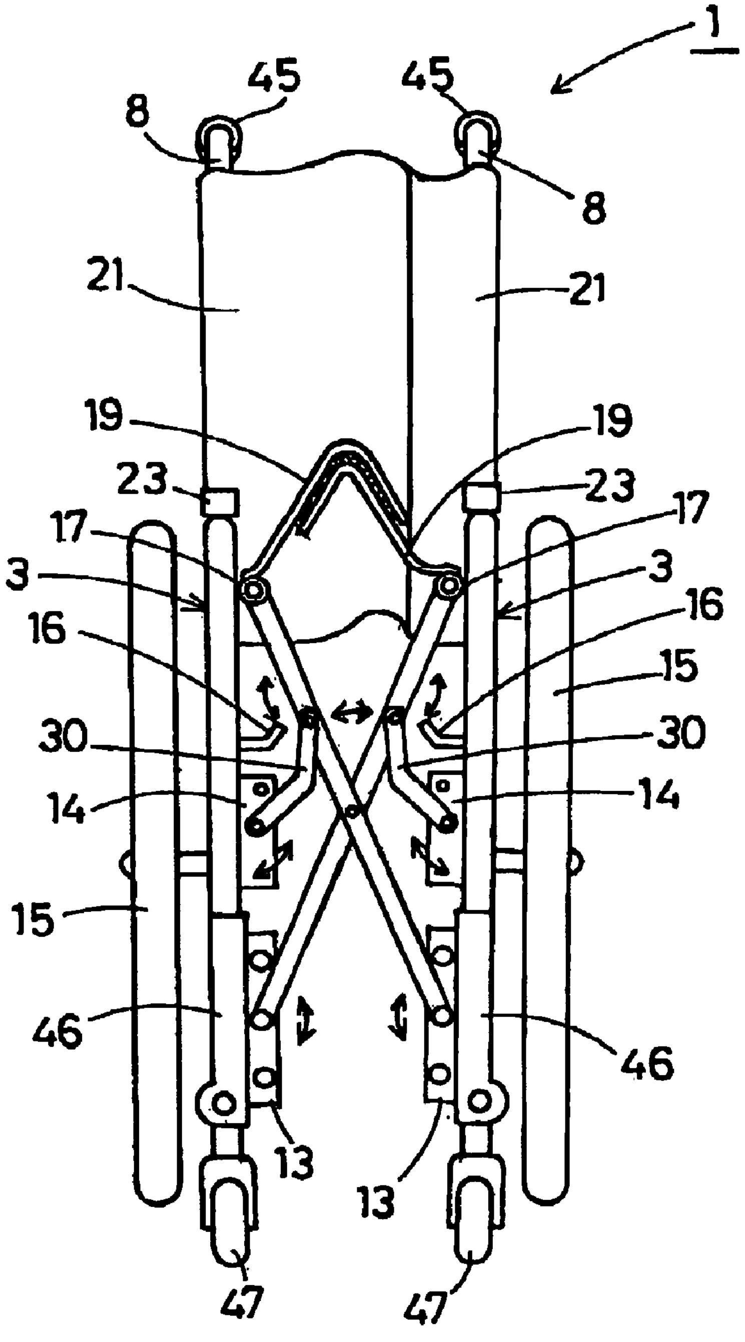
Figure 10:
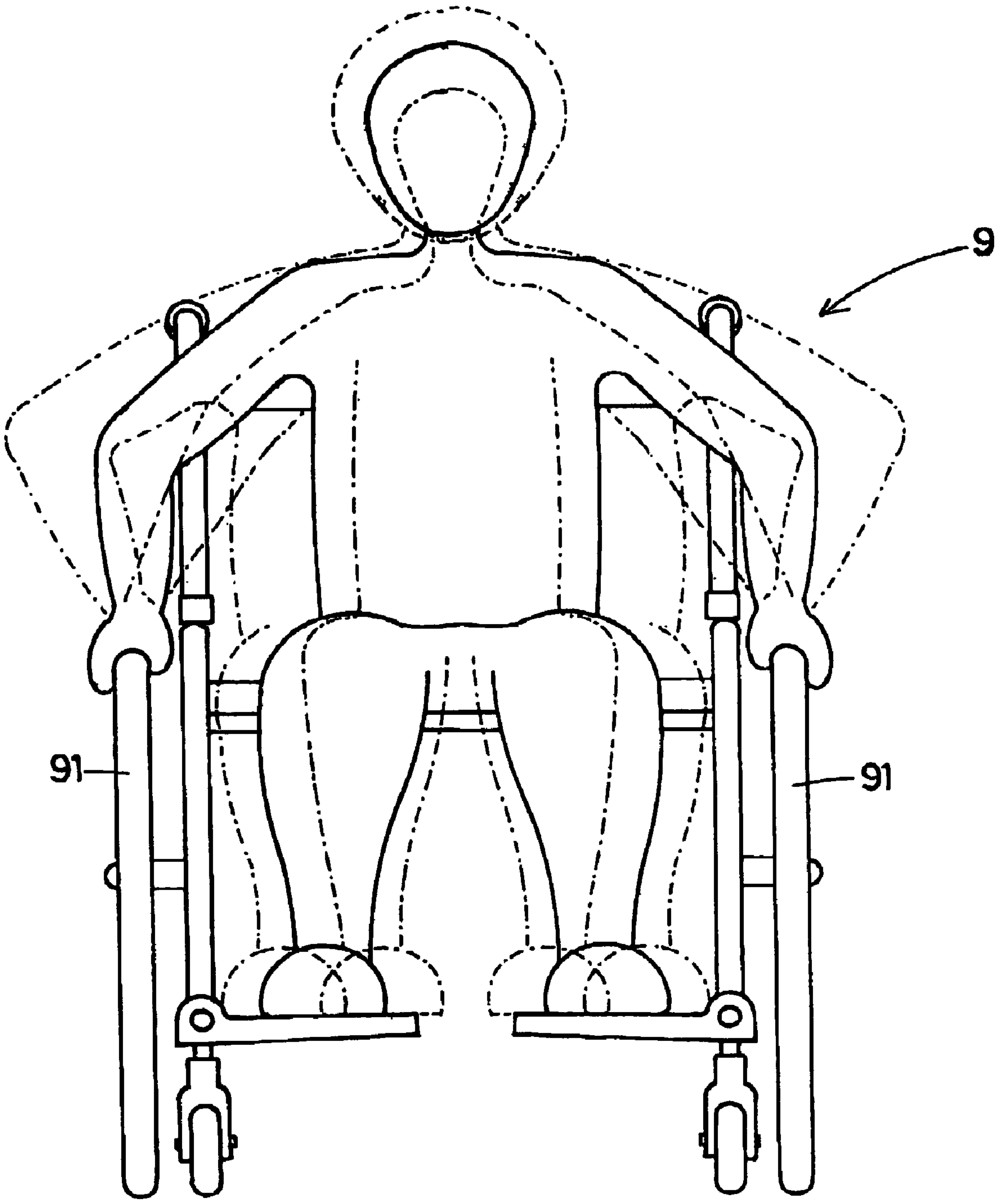
FIG. 10 is a descriptive front view of a conventional wheel chair.

As shown in FIG. 7, square pillar-type link arm brackets (14,14) are respectively welded to said left and right rear leg posts (6,6), and a plural number (3) of screw holes (14A, 14B,14C) are formed in suitable positions of each link arm bracket (14) along the rotational focus of said rear rotatable arms (12A, 12A).

To connect said side frames (3,3), using said X-frames (11,12), said lower side beams (18,18) are respectively fitted into one of holes(13A,13B,13C) of said side beam brackets (13,13), and, if holes such as holes (13A,13A) are selected, said axes (26,26) will respectively penetrate said holes (13A,13A) and said lower side beams(18,18), thus supporting said lower side beams (18,18). In this case, said upper side beams (17, 17) are respectively supported on said beam supporting members (16,16). Said X-frames (11,12) are respectively connected to left and right side frames (3,3) as described above, and then fixing bars (27,27) are respectively set into said fixing holes (13D,13D) of said side beam brackets (13,13) and fixing holes (26A,26A) of said axes (26) as shown FIG. 6. One end of said axis (26) is bent to be a handle which eases the positional adjustment of said axis (26) by limiting over-penetration of said axis (26).

Said left and right side frames (3,3) are connected to each by said front and rear X-frames(11,12) as described above, and then link arms (30,30) are respectively positioned between the upper parts of said rotatable arms (12A,12A), and said link arm brackets (14,14) of said rear leg posts (6,6), and fixed by bolts (31,32) as axes, being screwed into the most appropriate hole (14A) from among three holes (14A,14B,14C), and said left and right side frames (3,3) and said X-frames (11,12) are firmly connected to each other with said link arms (30,30) as shown in FIG. 7.

To adjust the width of said wheel chair (1) of this embodiment, said face fasteners (20,22) of said back cloths (19,19) and said seat cloths (21,21) are respectively peeled off each other, and then said fixing bars(27,27) are respectively pulled out of said fixing holes (13D,13D). Further, said axes (26) are respectively pulled out of said holes (13A,13A) and said lower side beams (18,18), and further, by removing said bolts (32) connecting said link arms (30) to said link arm bracket (14), the connections between said link arms (30) and said side frames (3,3) are respectively disengaged. In this state, said rotatable arms (11A, 11A, 12A,12A) of said X-frames (11,12) are respectively rotated around the centers C of said rotatable arms (11A,11A,12A, 12A) to adjust the widths of said X-frames (11,12) moving said side frames (3,3) in a crosswise direction, adjusting the width of said wheel chair (1).

By reducing the widths of said X-frames (11,12), the heights of said X-frames (11,12) are enlarged, while by extending the widths of said X-frames (11,12), the heights of said X-frames (11,12) are reduced, and each lower side beam (18) of said X-frame (11,12) is fitted to the most appropriate hole from among three holes (13A,13B,13C) and each axis (26) is inserted into said selected hole and said lower side beam (18, 18) to support said X-frame (11,12).

Said X-frames (11,12) are respectively connected to said side frames (3,3) as described above and then said fixing bars (27,27) are respectively inserted into said fixing holes (13D,13D), (26A,26A), and further, said link arms (30,30) are respectively positioned between the upper parts of said rotatably arms (12A,12A) and said link arm brackets (14,14) of said rear leg posts (6,6), and said bolts (31,32) are respectively screwed into said screw holes (12B,12B), and the most appropriate screw hole from among three screw holes (14A,14B,14C) of each said link arm bracket (14,14) to fix said link arms (30,30).

The width between left and right frames (3,3) is adjusted as described above, and said seat cloths (19,19) and back cloths (21,21) are again affixed to each other with face fasteners (20,22) to provide a seat with a back.

In this embodiment, said side beam bracket (13) has three holes (13A,13B,13C) and said link arm bracket (14) has three screw holes (14A,14B,14C), so that the width of said wheel chair can be adjusted in three stages. In the present invention, two, or four and more holes and screw holes may be prepared, and one X-frame, or three and more X-frames may be prepared.

Said axes (26, 31, 32) do not always need to be pivots or bolts, however, in the case they are as such, said lower side beams (18,18) and said link arms (30,30) are rotatable around axes, enabling said wheelchair (1) are foldable.

The width of said wheel chair of the present invention can be adjusted so that each individual user can easily achieve most comfortable width, and it is not necessary for a maker to prepare various kinds of wheelchair having various widths.

The invention claimed is:

1. A wheelchair having a pair of side frames connected to each other by one or more X-frame(s) wherein said X-frame consists of a pair of rotatable arms connected rotatably to each other at their respective centers, the lower ends of each rotatable arm being fixed to said side frames, the position at which each rotatable arm can be fixed to said side frame, being vertically adjustable to adjust the width of said wheelchair.

2. A wheelchair in accordance with claim 1, wherein the lower part of each rotatable arm is rotatably connected to the lower part of each side frame by an axis, being rotatably inserted into one of the holes which are vertically arranged in the lower part of each side frame.

3. A wheelchair in accordance with claim 1, wherein a link arm is positioned between the upper part of each rotatable arm and each side frame at least in an X-frame.

4. A wheelchair in accordance with claim 3, wherein each link arm is rotatably connected to each side frame by an axis, being rotatably inserted into one of a plural number of holes which are vertically arranged in each side frame.

* * * * *